UNITED STATES PATENT OFFICE

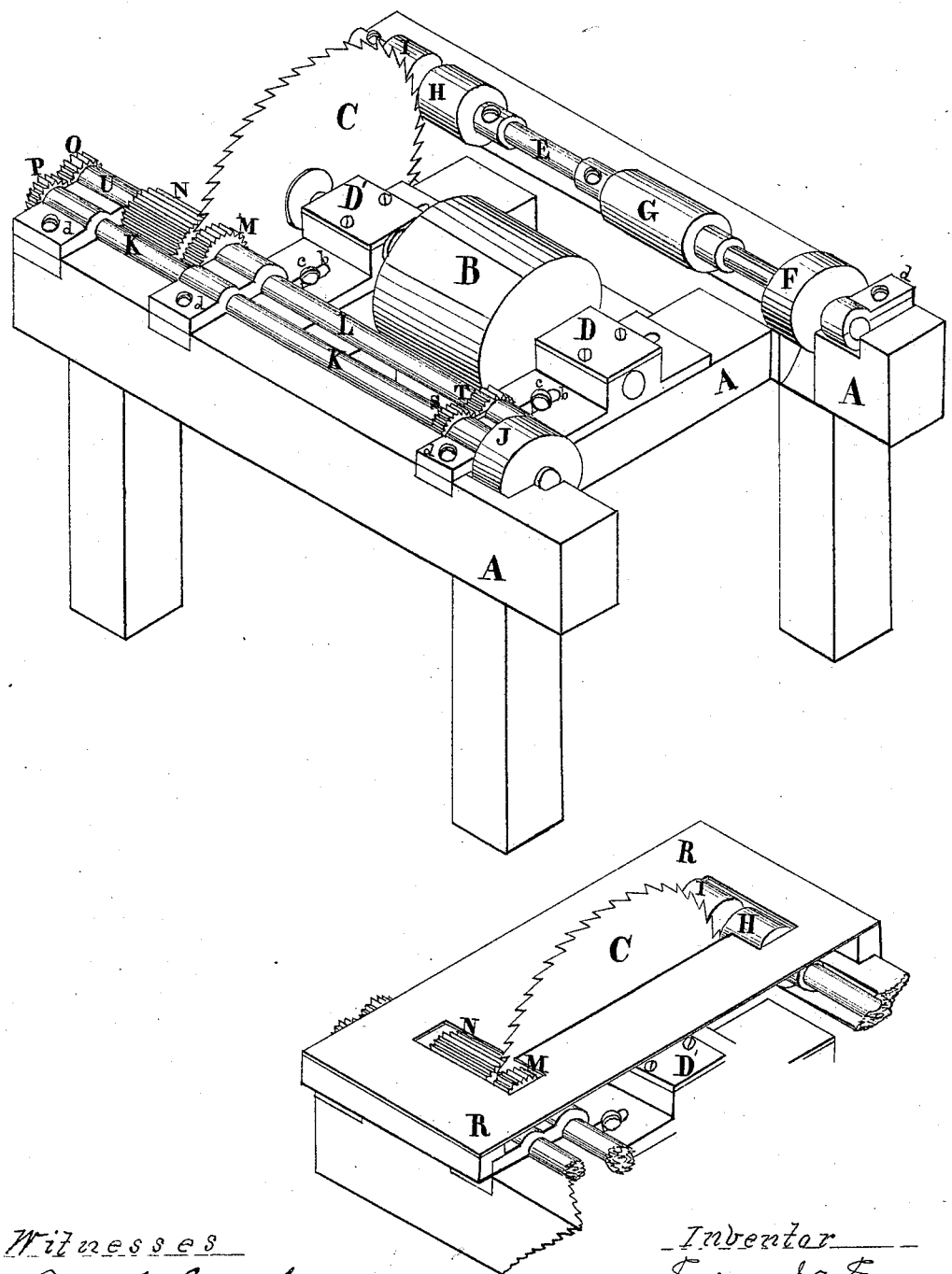

EDWIN N. EGERY, OF BANGOR, MAINE.

IMPROVEMENT IN LATH-MACHINES.

Specification forming part of Letters Patent No. 151,579, dated June 2, 1874; application filed April 16, 1874.

*To all whom it may concern:*

Be it known that I, EDWIN N. EGERY, of Bangor, in the State of Maine, have invented a Lath-Machine, of which the following is a specification:

The object of my invention is to construct a feed-roll for circular saws which can be used either singly to feed to a single saw, or, by using a number of short rolls, may be adapted to feeding lumber to a gang of saws; and also to employ, in combination with the circular saw, a chilled feeding-roll, and which, in order to give it the requisite degree of hardness, I cast in a cold metallic mold.

In all former general practice feed-rolls have been constructed either as long smooth or long fluted rolls, running either loosely or carried by power just far enough from the periphery of the saw to be free from contact with the teeth of the saw, except in the case of the Mutty roll, which is grooved to allow of bringing the roll nearer to the saw; but it is found that the groove does not always allow the roll to be adjusted to all the requirements of sawing short lumber by circular saws, and the groove cannot always be adjusted to the varying thickness of the saw; and, furthermore, the roll is made fixed or stationary on its arbors, and cannot be moved laterally to change the wear and prevent wearing all in one place.

In my invention, I have endeavored to overcome these objections; and, first, in order to prevent the wear from coming all in one spot on the roll, I construct rolls movable on a shaft, and adjustable by set-screws or keys, so that they may be moved laterally to the table, and thus made to wear equally on the whole length of the rolls, keeping them true for a much longer time than when used so as to wear all the time in one spot. Secondly, in order that the rolls may be adjusted both laterally to the saw and in the direction of the radius of the saw, to or from the center, and thus allow the teeth of the saw to cut by the full bigness or diameter of the rolls, I have arranged two rolls, one on each side of the saw, which rolls may be run at a uniform or a varying rate of speed; or one of the rolls may be run by power, and the other roll allowed to run loosely. They may also be adjusted laterally to the saw to accommodate the varying thickness of the saw. Thirdly, finding, from experience in the use of feed-rolls, that when cast from iron by the ordinary process they inevitably wear away, more or less speedily becoming useless, requiring to be often replaced with new rolls, and finding that, in order to obtain more durable rolls, many persons have even resorted to the laborious and expensive process of forging rolls from steel, and then planing and turning them into shape, I have constructed my rolls by casting them in cold metallic molds, thereby chilling and hardening the outer surface, rendering them hard as glass, and very much more durable than even the best steel rolls, and at the same time reducing the expense of manufacturing, for the molds, being formed of metal, are smooth and perfectly shaped; consequently, when the rolls are cast in these molds, the outside surface of the roll is smooth, and needs no labor of finishing up, as when cast in sand, but they are all ready for service as they come from the molds.

In the accompanying drawings, Figure 1 is a perspective view of a circular saw with the top of the table removed, and showing different rolls, and their relative position to the saw. Fig. 2 is a view of a saw with the top of the table in place, and showing how the rolls are placed to project above the top of the table, and relieve the friction of the bolt while passing by the saw over the top of the table.

Similar letters refer to corresponding parts in the different figures.

A A A A is the frame. B is a pulley for applying power to the parts. C is a circular saw. D D' are boxes in which the arbor of the saw revolves. E is a shaft. F is a pulley upon the shaft E. G is a long smooth-surfaced roll adjustable upon E. H and I are short smooth-surfaced rolls adjustable upon the shaft E. J is a pulley upon the shaft K. K is a shaft carrying the gear-wheels P and S. L is a shaft carrying the gear-wheel T and fluted feed-roll M. M and N are fluted feed-rolls running on independent shafts or arbors, the arbor of the roll N running in the box U. O is a gear-wheel attached to the same arbor with the feed-roll N. P is a gear-wheel attached to the shaft K. R is the top of the table. S is a gear-wheel attached to the shaft K. T is a gear-wheel attached to the shaft L. U is the box in which runs the arbor which connects N and O.

In operation, power may be applied to the pulleys by any of the ordinary means, and the circular saw revolved toward the feed-rolls N and M. While the rolls N and M are revolved toward the saw C, the bolt being placed so as to rest upon the rolls, the saw begins to cut, and as the bolt passes by the saw the force of the saw-teeth cutting through the bolt causes the bolt to press upon the feed-rolls, and as the bolt is thicker or thinner the pressure increases or diminishes, thus causing the bolt to feed past the saw at the proper rate. These rolls, being fixed on independent arbors, may be moved up to the saw, so that, if desired, the periphery of the saw may pass by the center of the rolls, and the rolls may also be adjusted endwise to or from each other to allow of a varying thickness of the saw. These rolls may also be adjusted so that one will run loosely without power, while the other may be driven by power. In this present case, however, power is applied to the pulley J, which carries the shaft K, to which are attached the gear-wheels P and S. These gear-wheels run in gear with and actuate the gear-wheels O and T, attached to the arbors of the feed-rolls N and M, respectively, and the gear-wheels P and S being of the same size, and the gear-wheels O and T being of the same size, the feed-rolls N and M will be revolved at the same or a uniform rate of speed. The feed-rolls H and I are intended to operate in connection with a saw revolving toward them, in a similar manner to that described for M and N—as, for instance, if the saw C were reversed on the arbor and caused to revolve and cut toward the rolls H and I; but the rolls H and I are made adjustable on the same shaft E, and may be fastened in place on E by any of the usual devices, such as set-screws, pins, or keys, and are intended to be adjustable to the thickness of a single saw or to be used with a gang of saws. The long feed-roll G is made to slide on the shaft E, and may be fixed at any part of the shaft by any of the above-named devices. When this roll is used in connection with a circular saw, as the saw cannot be fixed so that the periphery of the saw shall penetrate or infringe upon the periphery of the roll, of course, as the saw wears away by filing, there will be too much space between the bearing of the lumber on the top or apex of the roll and the point where the teeth of the saw are cutting and pressing downward, so that the lumber will spring more or less, and will not lie steady. To enable the operator to remedy this trouble, the boxes of the saw-arbor are constructed with slots b b b b, in which the screws c c may slide, and thus allow the saw to be moved and adjusted at the proper distance from the roll or the boxes in which the arbors of the rolls run may be similarly arranged, to allow the rolls to be moved instead of the saw.

In using rolls to feed lumber up to circular saws, or, in fact, any saws, the service required of the rolls is so severe as to rapidly wear off the surface of the roll, and wear it out of true and out of round. I have, therefore, constructed my rolls of iron, cast in metallic molds, thereby chilling the outside surface, rendering them very hard and durable, and almost impossible to wear out. This process I apply equally to fluted rolls, or to smooth cylindrical rolls. In the use of these feed-rolls, they are placed underneath the table or the top of the table on which the lumber is fed up to and past the saw, and only project far enough above the surface of the table to remove the friction of the lumber passing over the table.

I do not claim the use of feed-rolls, broadly; and I am aware of the patent of John Mutty for grooved rolls, when used in connection with his other machinery.

What I claim, and desire to secure by Letters Patent, is—

In combination with the saw of a lath-sawing machine, and for the purpose of feeding the bolts to the circular saw, a chilled feed-roll, substantially as shown and described.

EDWIN NELSON EGERY.

Witnesses:
  FRED. H. COOMBS,
  CHAS. A. GIBSON.